Nov. 18, 1952 P. W. JOHNSON 2,618,070
DIMENSION GAUGE
Filed June 2, 1945 2 SHEETS—SHEET 2
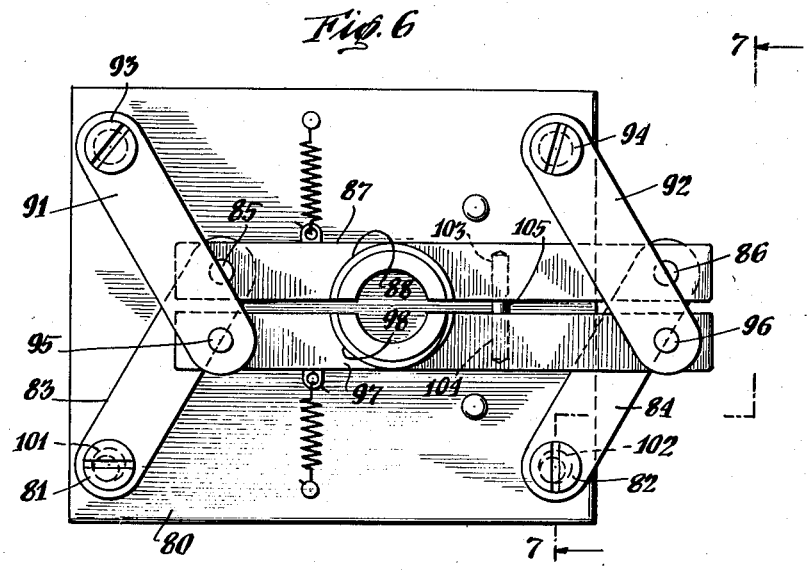
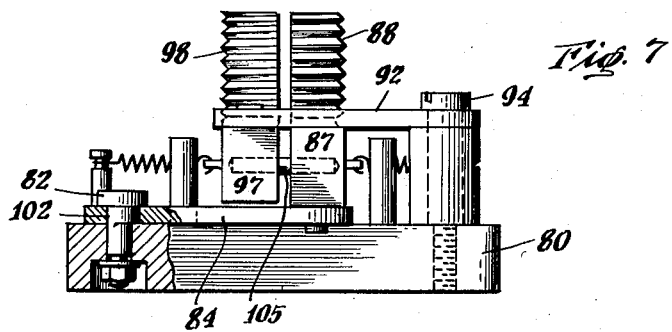
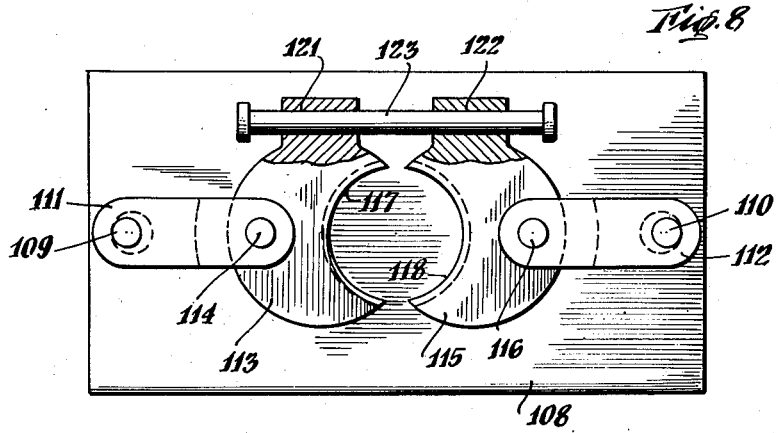
INVENTOR
Paul W. Johnson
BY
Bohleber, Jassett & Montstream
ATTORNEYS Patented Nov. 18, 1952

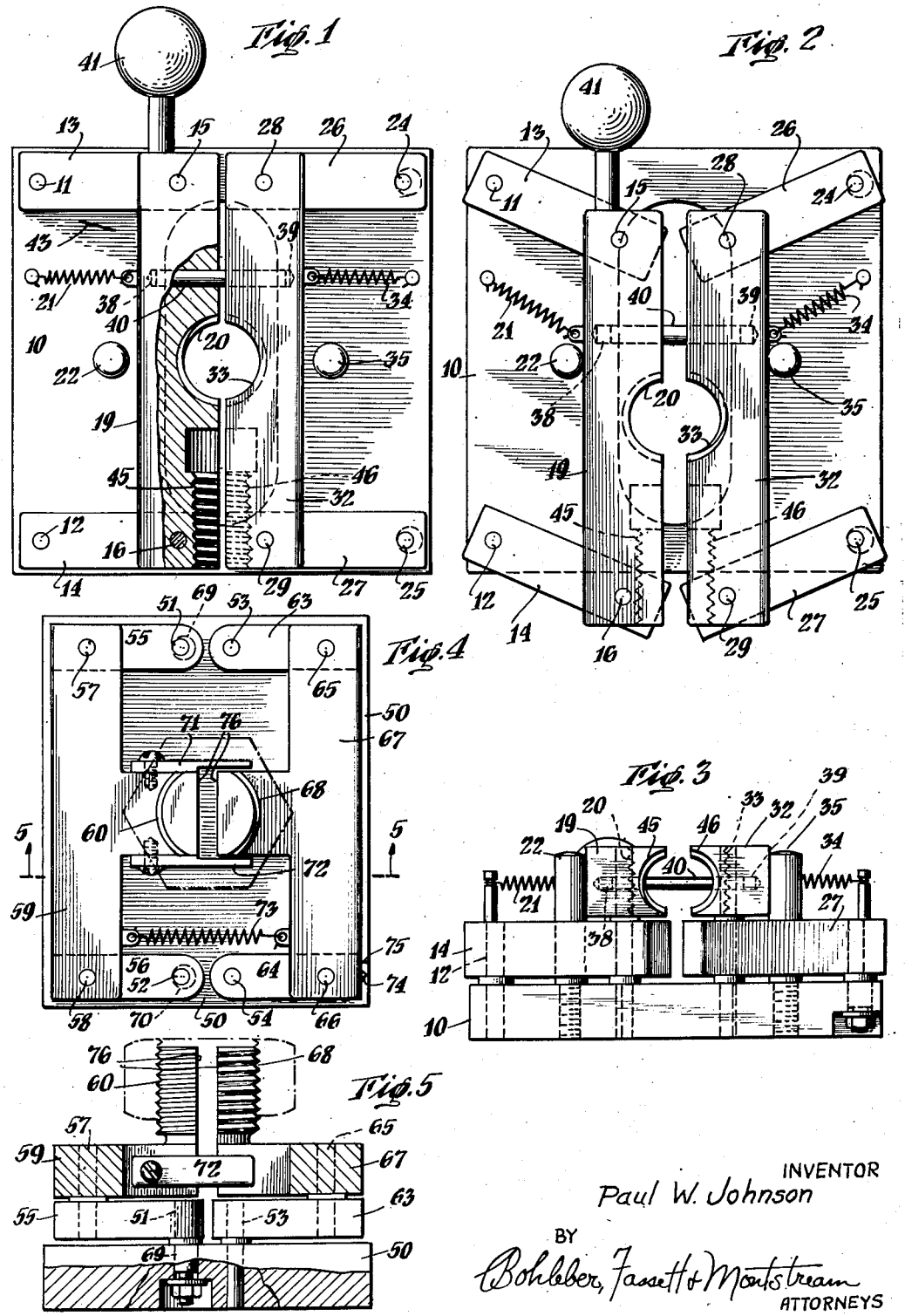

2,618,070

UNITED STATES PATENT OFFICE 2,618,070

DIMENSION GAUGE

Paul W. Johnson, Bloomfield, Conn., assignor to Johnson Gage Company, Bloomfield, Conn., a partnership of Connecticut Application June 2, 1945, Serial No. 597,329

30 Claims. (Cl. 33—178)

1

The invention relates to a gage for determining whether or not a test part is within allowable tolerances. It may be constructed for testing external threads such as on a screw or bolt and may also be constructed to test internal threads such as the threads on a nut. Likewise the gaging surfaces may be formed to test parts with annular ridges or grooves as distinguished from the helical grooves or ridges of threaded parts. By providing the gaging means with smooth surfaces, the gage may test the external size of a cylindrical test part or the internal diameter of a hole. The gage has wide application in testing either the external or internal size of a test part, particularly cylindrical parts which may be smooth surfaced, annularly ridged or grooved, or threaded. The gage operates as a snap gage of the ring or plug type, that is the entire or substantially the entire circumference is engaged and the operation is to project the test part laterally, rather than longitudinally or axially through the gage in the manner of and with the speed of a snap gage.

It is an object of the invention to construct a new and novel plug or ring gage.

Another object is to construct a new and novel ring or plug gage which gives circumferential contact by a parallel movement of the gaging members and operates with the speed of a snap gage.

Another object is to construct a gage of the segmental gage type having either a concave or convex gaging surface in which the segmental gaging means move towards and away from each other in one or a lateral direction as the gaging elements move in another direction or longitudinally with respect thereto.

Another object is to construct a gage utilizing pivoted segmental gaging means which are mounted upon parallel links so that as the gaging means swings on its pivot means or link means, the segmental gaging means moves with a parallel motion towards and away from each other into and away from gaging position.

Another object is to provide a gage of the parallel motion type which may be constructed so that open position of the segmental gaging means may be at a point where the parallel link means are in angular position and gaging position may be at a point where the parallel link means is in straight line or substantially straight line position or the converse thereof and irrespective of whether the gaging surfaces are concave or convex.

2

A still further object of the invention is to construct a gage in which the link means have movable or free ends extending away from each other or in which the link means may have their movable or free ends directed towards each other.

Another object is to construct a gage having pivotal segmental gaging means which retain a parallel position with respect to each other as the gaging means swings upon its pivot means.

Other objects of the invention will be more apparent from the following description taken in connection with the accompanying drawings which illustrate several embodiments of the invention in which:

Figure 1 is a plan view of a gage having concave gaging surfaces for gaging external surfaces in which the parallel link means have movable portions or ends directed towards each other so that gaging position is determined by the link means being in straight or substantially straight line position.

Figure 2 is a plan view of the gage of Figure 1 with the gaging means in open or inserting position.

Figure 3 is an end view of the gage of Figure 1.

Figure 4 is a plan view of a gage having convex gaging surfaces for gaging internal surfaces and in which the movable or free ends of the link means are directed away from each other so that gaging position is reached when the link means is in straight line or substantially straight line position.

Figure 5 is a sectional view of the gage taken on line 5—5 of Figure 4.

Figure 6 is a plan view of a gage for testing an internal surface in which gaging position of the gaging segments or means is reached when the link means are in straight line position and open position is reached when the link means are in angular position.

Figure 7 is a side elevation of the gage of Figure 6.

Figure 8 is a plan view of a gage having parallel movement of the gaging means utilizing single links which movement is obtained by pivoting the gaging means upon the link means and a pin engages both gaging means to give parallel movement of the gaging means.

In the gaging of test parts, with snap gages it is common practice to determine proper diameter with gaging elements which engage the test part at a point or by line contact at diametrically opposite sides of the test part. This type of snap gage, gives a quick determination as to whether or not the test part is of the proper diameter and hence presumably capable of assembly with its mating part. Such gages however, could and frequently do miss a defect in the test part which may render that part incapable of assembling with its cooperating or fitting part. This is particularly true of screw threads. As a consequence a test for assemblability of a screw thread is not complete or conclusive until the test part has been threaded into a ring gage.

Testing with a ring gage is a slow and tedious process and for that reason the gage shown and to be described herein has many advantages. One advantage is that it has the speed of a snap gage and gives circumferential contact or engagement with the test part so that it determines overall assemblability of the test part with the same effectiveness that a ring gage would accomplish this result. The gage herein has a further advantage in that a solid ring gage invariably wears bell mouthed after use irrespective of whether the gage is for screw threads or plain cylindrical surfaces. With the gage to be described herein all portions of the gaging surface receive equal wear and consequently no bell mouthed condition of the gage can occur.

The gage illustrated in Figures 1 to 3 includes a frame 10 which may be of any form, that particularly illustrated being a substantially flat plate. The plate is a fixed frame forming a stationary base for the gage parts. The frame carries pivot means which includes a pair of spaced pivots 11 and 12. Link means is mounted upon the pivot means which includes links 13 and 14 mounted upon pivots 11 and 12 respectively. The free or movable ends or portions of each link carries a pivot 15 and 16, respectively. Gaging means 19 is carried upon the pivots 15 and 16 so that the links 13 and 14 are in parallel relation. The gaging means carries a gaging surface 20, which in the illustrated construction is a concave gaging surface, for engaging the outer surface of a cylindrical part and may be a threaded concave gaging surface for engaging an external thread. Means may be used to normally retain the gaging means in open or gaging position, the means illustrated being a spring 21. A stop 22 limits the extent of opening movement of the gaging means.

A pivoted gaging means cooperates with the gaging means 19. Preferably this cooperating gaging means is a duplicate parallel link structure and includes pivot means in the form of a pair of spaced pivots 24 and 25 carried by the frame. Each pivot carries a link 26 and 27 respectively, and the free or movable end of each link carries a pivot 28 and 29.

Upon the pivots 28 and 29 is mounted a gaging means 32 which carries a gaging surface 33 which is concave and for a screw thread this surface would be threaded. The two half sections or segments 20 and 33 of the gaging means cooperate to form a ring gage when in gaging position. Means may be provided to retain the gaging means 32 in open or gaging position, the means particularly illustrated being a spring 34 which normally impels the gaging means to open position. A stop 35 limits the extent of opening movement of the gaging means.

Means may be provided to adjust the position of the gaging means which means may be carried by any pair of pivots, such as 11 and 12, 15 and 16, 28 and 29, or 24 and 25. The adjusting means is shown applied to the pivots 24 and 25 and they constitute a well known eccentric pivot, turning of which adjusts the position of the gaging means 32 with respect to its cooperating gaging means 19.

Preferably means may be used to retain the segmental gaging means in alignment laterally with respect to each other. This means may take many forms, that illustrated including holes 38 and 39 in each gaging means and a pin 40 extending into these holes. As the gaging means swing or move longitudinally upon their parallel link means, the gaging means move laterally towards and away from each other and the pin 40 slides in the holes 38 and 39. The pin, however, retains the gaging means in lateral alignment as they swing upon their links.

In operation the gaging means are in open position with the gaging surfaces in spaced apart relation so that a test part may be inserted thereinto. The test part or the gaging means may then be moved longitudinally so that the gaging means swing on their link means to bring the gaging surfaces together and engage the test part.

The gage may be adjusted or constructed in two ways. For example the construction or adjustment may be such that if the test part and gaging means, when moved longitudinally within the gage means, pass through straight line position of the parallel links, the test part is gaged as not being oversized or defective in any respect which would affect its assemblability. An oversized piece would not pass through this straight line position. It is clear that if the test part is of the proper size the gaging means may remain in open position on the opposite side from that shown, the test part removed and a second test part inserted for test and moved in the reverse direction to or through gaging position. A handle 41 may be used for moving the gaging means longitudinally rather than to gage by pressing the test part longitudinally. When the gage is so adjusted or constructed the gaging position is at the point where the links are in parallel or in straight line position.

The gage may be constructed or adjusted so that a test part of the proper dimension does not reach parallel or straight line position of the link means. In such case the angular position assumed by the links would determine whether or not the test part were of the proper size, oversized or undersized. An undersized test part would permit the link means to approach closer to straight line position or even pass therethrough. Suitable means may be utilized to indicate the position of the gaging means or parallel links such as the markings 43 on the frame which cooperate with the edge of a link to indicate the size of the test part. Other devices may be utilized to indicate the position of the gaging means to determine whether it is of the proper size, oversize or undersize.

In the construction described the gaging means have their gaging surfaces or the axis thereof, extending vertically with respect to the gaging means or the direction of their movement. The gaging surfaces may, however, extend longitudinally of the gaging means as illustrated by the gaging surfaces 45 and 46 in the ends of the gaging means.

It will be observed that, in the construction shown with concave gaging surfaces for testing the external surface of a test part, when the link means are in their extreme angular position they are in open position. Gaging position is determined by the link means being in straight line or an angular position adjacent to straight line position. The concave gaging surfaces may be substituted by convex gaging surfaces which would gage a hole in a test part or an internal thread. With convex gaging surfaces upon a stud, gaging position would be determined by the link means being in parallel or straight line position or adjacent such position where the gaging segments of the gaging stud are adjacent each other. As the gaging means moves or swings longitudinally, the convex gaging means move away from each other to gaging position which would be defined by an angular position of the link means.

It is clear further that the gaging surfaces may be located anywhere along the gaging means or bar. If the gaging surfaces are located at one of the pivots on the movable end of the link, a single link serves to swing the gaging means and surfaces towards and away from gaging position and the other link therefore serves merely as means to retain the gaging means or gaging surfaces in parallel relation with respect to each other.

There is shown in Figures 4 and 5 another form of construction in which the pivot means are adjacent to each other and the link means have their movable ends directed away from each other. The gage so constructed includes a frame 50 provided with pivot means which in the construction shown includes two pairs of pivots 51 and 52, and 53 and 54. It is clear, however, that a single pair of pivots will serve equally well. Link means are carried by each pair of pivots, a link 55 being mounted upon the pivot 51 and a link 56 being mounted on the pivot 52. The movable end of each link of the pair carries a pivot 57 and 58 respectively. Gaging means in the form of a bar 59 is mounted upon the pivots 57 and 58 which gaging means carries a gaging surface 60 which is shown as a segmental plug with a convex surface which may be smooth, grooved or rigid or threaded to gage an internal thread.

The pivots 53 and 54 likewise carry link means which include a link 63 mounted upon pivot 53 and a link 64 mounted upon the pivot 54. The movable ends or portions of the links carry pivots 65 and 66 respectively upon which is pivotally mounted a gaging means or bar 67. A cooperating gaging surface 68 is carried by the gaging means 67.

Means are provided to retain the gaging means in lateral alignment which means may be of any desired form, that illustrated including straps 71 and 72 which may be secured to one of the gaging means. There is also provided means to retain the gaging means in open position, the means shown being a spring 73 each end of which is attached to a gaging means. The flat faces of the gaging stud or plug serve as a stop to limit inward movement thereof.

In operation, the gaging means 59 and 67 are in adjacent position which it will be observed is when the link means are in a relative extended angular position. A test part such as a nut is then placed over the gaging surfaces or stud and moved longitudinally which swings the link means towards straight line or parallel position and during such movement, the gaging surfaces move outwardly to gaging position. With convex gaging surface as illustrated the inserting or open position is determined by the link means being in angular position relative to each other and gaging position is determined by the link means being in straight line or substantial straight line or parallel position. The gage illustrated in Figures 4 and 5 may be operated in the same manner as the gage illustrated in Figures 1 through 3, that is the test part and gaging means may pass beyond parallel or straight line position for the link means for a test part which is not oversize. If desired, however, the gage may be constructed or adjusted so that gaging position is adjacent to straight line or parallel position yet not passing therebeyond excepting perhaps for an oversize piece. A pointer 74 and its position with respect to a mark or line 75 may indicate whether the test piece is of proper size, undersize or oversize.

The position of the gaging surfaces may be adjusted if desired by any suitable adjusting means that particularly illustrated including eccentric pivots 69 and 70. As explained hereinbefore any of the pivots may carry the adjusting means.

It is to be understood that this gage may have concave gaging surfaces substituted for the convex in which case insert or open position would be defined by the link means being in parallel or straight line position and gaging position being at an extended angular position of the link means. With concave gaging surfaces, open position for the gage would be that position of the gaging means when they are in spaced relation whereupon longitudinal movement brings them together to gage a test part. The extent of angular movement such as indicated by the pointer 74 would determine whether the piece was within the allowable tolerances. The gage of Figures 4 and 5, therefore, operates in a reverse manner for the respective gaging surfaces whether convex or concave from that of the construction of Figures 1 to 3.

A still further form is illustrated in Figures 6 and 7. These figures illustrate how the reverse action of the form shown in Figures 1 through 3 can be accomplished with a style of construction in which spaced pivot means is used and the free ends of the link means are directed towards each other. The gage includes a frame 80 which may be a flat plate having pivot means which includes a pair of spaced pivots 81 and 82. Link means which includes links 83 and 84 are carried by the pivots 81 and 82 respectively. The free end of each link carries a pivot 85 and 86 respectively. A gaging means in the form of a bar 87 is pivotally mounted upon the pivots 85 and 86 and carries a gaging surface 88 which may be either convex or concave, the former being illustrated.

A gaging means is provided to cooperate with the gaging means 87 which is carried by pivoted link means which preferably comprises a pair of parallel links 91 and 92 each of which is pivoted to the frame 80 upon spaced pivots 93 and 94 respectively. The movable end of each link carries pivots 95 and 96 upon which is mounted a gaging means 97 having a gaging surface 98 which cooperates with the other segmental gaging surface 88. In order to avoid interference in the longitudinal movement of the gaging means and the swinging movement of the links, the parallel links 83 and 84 may engage the underside of its respective gaging means 87 and the parallel links 91, 92 pivotally engage its respective gaging means on the upper side thereof. Other means of mounting may be provided.

In the gage of Figures 6 and 7, the parallel link means are long enough so that the pivots for the gaging means on the movable end thereof lie beyond the pivot means on the movable ends of the other pair of parallel links. This particular construction is not necessary and the same result can be achieved with shorter links such as the links of Figures 1 to 3. All that is necessary is to have each of the cooperating gaging surfaces extend over to the opposite side of its cooperating gaging means relatively to the frame pivots thereof. In other words, the gaging surface 88 is on the opposite side of the gaging surface 98 with respect to its frame pivots 81 and 82. The structure illustrated constitutes a reversal of position of the gaging surfaces by overlapping link means and it is clear that the same result can be achieved by providing overlapping gaging means. Since the gaging means operate with a parallel movement there would be no interference between the reverse positions of the gaging means.

A pair of pivots may be adjustable such as by means of eccentric pivots 101 and 102. The adjustment may be at any pair of pivots. The gaging means are retained in lateral alignment by any suitable means such as a hole 103 in the gaging member 87 and a hole 104 in the gaging means 97 in which an alignment pin 105 is received. The pin is freely slidable in the holes so that the gaging means may move freely in a lateral direction as they move longitudnally on the swinging link means.

It is clear from the various forms of construction illustrated herein that reverse operation of the construction of Figures 1 through 3 may be accomplished in two ways. In Figures 1 through 3 the gaging surfaces are in open position when the link means are in angular position and they are in gaging position when the link means are in straight or parallel position or substantially that position. The reverse action may be obtained by the construction illustrated in Figures 4 and 5 in which the link means has its movable ends projected away from each other. The same reverse action may be obtained by the overlapping construction of Figures 6 and 7.

Similarly if a gaging stud or convex gaging surfaces are provided in the construction Figures 1 through 3 instead of the concave gaging surfaces there disclosed, the operation necessarily is the reverse of that for a concave gaging surface. In other words, when the link means are in straight line or parallel position the gage is in inserting and releasing position and when the link means is in angular position the gage is in gaging position. The reverse of this action may be obtained either by the construction of Figures 4 and 5 or by the type of construction illustrated in Figures 6 and 7.

A simple form of the invention is illustrated in Figure 8 in which the frame 108 carries pivot means which may be a single pivot or its equivalent of adjacent pivots with the movable ends of the link means directed away from each other or may be a pair of spaced pivots 109 and 110 as illustrated. The pivot means carry a pair of link means, that illustrated being a single link 111 mounted upon the pivot 109 and a like link 112 mounted upon the pivot 110. Each link means carries gaging means, the link 111 having a gaging means 113 pivotally mounted upon a pin 114. Similarly a gaging means 115 is carried by the movable end of the link 112 on a pivot 116. Each gaging means is provided with a gaging surface, the gaging means 113 having a gaging surface 117 which is shown as a concave gaging means and the gaging means 115 having a gaging surface 118 the gaging surfaces 117 and 118 cooperating together. The gaging means swing longitudinally, that is vertically as viewed in Figure 8, on the link means and in so doing they move laterally towards and away from each other.

Means are provided to impart parallel movement to the gaging means and also to retain them in lateral alignment or in cooperative relation. The means shown in Figure 8 comprises a guide or hole 121 carried by the gaging means 113 and the gaging means 115 carries a like guide or hole 122. Means in the form of a bar or pin 123 engages in the guide means so that as the gaging means swing on the pivot means they are given a parallel movement and also are retained in lateral alignment or in cooperative gaging relation.

The gage particularly illustrated in Figure 8 shows the use of spaced pivot means and link means mounted thereon having their movable portions or ends directed towards each other. Obviously the pivot means may be a single pivot or closely adjacent pivots and the link means may have their movable ends directed away from each other as taught in the construction of Figure 4. Likewise the gaging means show concave gaging surfaces and it is clear that convex gaging surfaces may be provided in place thereof and also with a construction in which the link means have their movable ends extending towards each other or away from each other. It will be observed also that in the construction illustrated in Figure 8 the pin and guide means serves the double function of imparting or giving parallel movement to the gaging means and also retaining them in lateral or cooperative alignment.

All of the gages illustrated and described herein utilize a wedging action in that as the gaging means move longitudinally together in one direction, the gaging means also move laterally in opposite directions towards and away from each other. The preferred manner of achieving this wedging movement is by pivot link means which gives a radial or circumferential wedging action which provides fast relative movement laterally at one end of the longitudinal movement and slow relative movement laterally at or adjacent parallel position of the link means. Also with the radial or circumferential movement, the gaging means may move from open position laterally to closed position and then again to open position with continuous longitudinal movement in one direction. Although concave or convex gaging surfaces art shown to provide circumferential contact, the gaging surfaces may be of a form which engages the test part at a plurality of points upon its circumference. The gaging surface on at least one of the gaging means of all the gages illustrated has a varying dimension laterally and usually both have this characteristic. The gaging surfaces are shaped to correspond with the shape of the portion of the test part which is to be gaged. Each of the gages shown and described herein may have the axis of the gaging surface perpendicular or parallel with the direction of longitudinal movement as shown in the gage of Figure 1. In each of the gages the gaging surfaces are in cooperating gaging positions with respect to each other in a region of the links in or adjacent to in-line or straight line position or its equivalent parallel position. Each of the gages utilizing a parallel link construction shows each gaging means carried by parallel links and it is contemplated that one gaging means may be so mounted and the other gaging means may utilize a link means having a single link.

In the gages illustrated in Figures 1 through 7, parallel movement of the respective gaging means is secured with respect to its own movement when the links controlling the movement of each gage means are of equal length between the pivots on each link and when the distance between the pivots on the gaging means is the same as the spacing of the pivots carried by the base. Parallel movement of each gaging means with respect to the other is secured with the conditions set forth above and in addition if the frame pivot means for each gaging means is also equally spaced or parallel, that is the distance between pivots 11 and 24 being the same as the distance between pivots 12 and 25. Parallel movement between the gaging means of the gages of Figures 3 through 7 is also secured when the pivot spacing thereof is also the same. The gaging means of Figure 8 have parallel movement, that is, a line carried thereon will always be parallel with its position at any position of the gaging means throughout its movement.

The invention is presented to fill a need for improvements in a gage. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A gage for a test part comprising a frame, spaced pivot means carried by the frame, a first link means pivotally mounted on one pivot means, a second link means pivotally mounted on the other pivot means, the link means having the movable portions thereof directed towards each other, cooperating gaging means pivotally mounted on each link means, and means connected with the gaging means and controlling the movement thereof for parallel movement with respect to each other whereby the gaging means move towards and away from each other as the link means pivot for gaging and releasing a test part.

2. A gage for a test part comprising a frame, substantially spaced pivot means carried by the frame at least one of which includes a pair of spaced pivots, a first link means including a pair of links of equal length between pivots each of which is pivotally mounted to the frame upon one of the pair of spaced pivots, a second link means pivotally mounted to the frame upon the second pivot means, the link means having movable portions thereof directed towards each other, gaging means pivotally mounted to the pair of links and having a distance between pivots equal to that of the spaced frame pivots for parallel movement, and cooperating gaging means pivotally carried by the second link means, and the gaging means moving towards and away from each other as their link means swing on their pivots for gaging and releasing a test part.

3. A gage for a test part comprising a frame, substantially spaced pivot means carried by the frame, at least one of which includes two spaced pivots, a first link means including a pair of links of equal length between pivots each of which is pivotally mounted to the frame upon one of the pair of spaced pivots, a second link means pivotally mounted to the frame upon the second pivot means, the link means having the movable portions thereof directed towards each other, gaging means pivotally mounted upon the first link means and having a distance between pivots equal to that of the spaced frame pivots, a cooperating gaging means pivotally carried by the second link means, the gaging means moving towards and away from each other as their link means swing on their pivots for gaging and releasing a test part, and means to retain the link means in lateral alignment.

4. A gage for a test part comprising a frame, pivot means carried by the frame including a pair of spaced pivots, a first link means including a pair of links of equal length between pivots each of which is pivotally mounted upon a pivot, a second link means pivotally mounted upon the frame, the link means having their movable portions directed towards each other, gaging means pivotally mounted upon the first link means and having a distance between pivots equal to that of the spaced frame pivots and cooperating gaging means pivotally mounted to the second link means for parallel movement with respect to each other whereby the gaging means move towards and away from each other as the link means pivot for gaging and releasing a test part.

5. A gage for a test part comprising a frame, pivot means carried by the frame including one pair of spaced pivots, a first link means including a pair of links of equal length between pivots each of which is pivotally mounted upon a pivot, a second link means pivotally mounted upon the frame, the link means having their movable portions directed towards each other, gaging means pivotally mounted upon the first link means and having a distance between pivots equal to that of the spaced frame pivots, cooperating gaging means pivotally mounted to the second link means for parallel movement with respect to each other whereby the gaging means move towards and away from each other as the link means pivot for gaging and releasing a test part, and means to retain the gaging means in lateral alignment.

6. A gage for a test part comprising a frame, a pair of spaced pivots carried by the frame, a pair of links of equal length between pivots one end of each link being carried by one of the pivots, a second pair of spaced pivots carried by the frame and parallel with the first pair, a second pair of links of equal length between pivots one end of each link being carried by one of the pivots, each pair of pivots being a substantial distance from each other so that the movable ends of the links are directed towards each other, cooperating gaging means having a distance between pivots the same as that of the spaced frame pivots and pivotally mounted to each pair of parallel links for parallel movement with respect to each other whereby the gaging means move towards and away from each other as the links pivot, a cooperating gaging surface carried by each gaging means at least one of which is of varying dimensions laterally and corresponds with the shape of the portion of the test part to be gaged the gaging surfaces being carried by the gaging means adjacent to each other, and the gaging means for each pair of parallel links being located upon the same side as its pivot with respect to the other gaging means whereby the gaging means are in open position when the links are angularly disposed to each other.

7. A gage for a test part comprising a fixed frame forming a stationary base, pivot means on the frame, a first link means mounted upon the pivot means and having a swingable portion, a second link means mounted upon the pivot means and having a swingable portion, gaging means pivotally mounted upon the swingable portion of each link means, a cooperating gaging surface carried by each gaging means at least one of which is of dimension to engage the test part at a substantial peripheral dimension of the test part and corresponding with the shape of the portion of the test part to be gaged, the cooperating gaging surfaces being in cooperative gaging relation with each other in a region including in-line position of the link means and positions adjacent thereto, the gaging surfaces being carried by the gaging means adjacent to each other, and the gaging means moving with a double movement longitudinally in one direction and laterally thereto towards and away from each other to and from gaging and releasing positions as the link means swing on the pivot means, and means connected with the gaging means to control the movement of the gaging means so that the cooperating gaging surfaces are in cooperative gaging relation at gaging position as the link means swing on the pivot means.

8. A gage for a test part comprising a fixed frame forming a stationary base, pivot means on the frame, a first link means mounted upon the pivot means and having a movable portion, a second link means mounted upon the pivot means and having a swingable portion, gaging means pivotally mounted upon the swingable portion of each link means, a cooperating gaging surface carried by each gaging means at least one of which is of a dimension to engage the test part at a substantial peripheral dimension of the test part and corresponding with the shape of the portion of the test part to be gaged, the cooperating gaging surfaces being in cooperative gaging relation with each other in a region including in-line position of the link means and positions adjacent thereto, the gaging surfaces being carried by the gaging means adjacent to each other, the axis of the gaging surfaces being parallel to the longitudinal movement of that gaging means, and the gaging means moving with a double movement longitudinally in one direction and laterally thereto towards and away from each other to and from gaging and releasing positions as the link means swing on the pivot means, and means connected with the gaging means to control the movement of the gaging means so that the cooperating gaging surfaces are in cooperative gaging relation at gaging position as the link means swing on the pivot means.

9. A gage for a test part comprising a fixed frame forming a stationary base, pivot means on the frame, a first link means mounted upon the pivot means and having a swingable portion, a second link means mounted upon the pivot means and having a swingable portion, gaging means pivotally mounted upon the swingable portion of each link means, a cooperating gaging surface carried by each gaging means at least one of which is of a dimension to engage the test part at a substantial peripheral dimension of the test part and corresponding with the shape of the portion of the test part to be gaged, the cooperating gaging surfaces being in cooperative gaging relation with each other in a region including in-line position of the link means and positions adjacent thereto, the gaging surfaces being carried by the gaging means adjacent to each other, the axis of the gaging surfaces being perpendicular to the direction of movement of the gaging means, and the gaging means moving with a double movement longitudinally in one direction and laterally thereto toward and away from each other to and from gaging and releasing positions as the link means swing on the pivot means, and means connected with the gaging means to control the movement of the gaging means so that the cooperating gaging surfaces are in cooperative gaging relation at gaging position as the link means swing on the pivot means.

10. A gage for a test part comprising a fixed frame forming a stationary base, pivot means on the frame, a first link means mounted upon the pivot means and having a swingable portion, a second link means mounted upon the pivot means and having a swingable portion, gaging means pivotally mounted upon the swingable portion of each link means, a cooperating gaging surface carried by each gaging means at least one of which is of a dimension to engage the test part at a substantial peripheral dimension of the test part and corresponding with the shape of the portion of the test part to be gaged, the cooperating gaging surfaces being in cooperative gaging relation with each other in a region including in-line position of the link means and positions adjacent thereto, and the gaging means moving with a double movement longitudinally in one direction and laterally thereto towards and away from each other to and from gaging and releasing positions as the link means swing on the pivot means, and means connected with each gaging means to control the movement of the gaging means so that the cooperating gaging surfaces are in cooperative gaging relation at gaging position and retain them in cooperative relation with respect to each other as the link means swing on the pivot means including guide means carried by each gaging means, and bar means engaging the guide means.

11. A gage for a test part comprising a fixed frame forming a stationary base, a pair of spaced pivot means provided on the frame, a first link means mounted upon one of the pivot means and having a swingable portion, a second link means pivotally mounted upon the second pivot means and having a swingable portion, gaging means pivotally mounted upon the swingable portion of each link means, the gaging means having a double movement longitudinally in one direction and laterally thereto towards and away from each other as their link means swing on the pivots for gaging and releasing a test part, a cooperating gaging surface carried by each gaging means at least one of which is of a dimension to engage a substantial peripheral dimension of the test part and corresponding with the shape of the portion of the test part to be gaged, the cooperating gaging surfaces being in cooperative gaging relation with each other in a region including in-line position of the link means and positions adjacent thereto, the gaging surfaces being carried by the gaging means adjacent to each other, and means retaining the gaging means in parallel relation with respect to each other.

12. A gage for a test part comprising a fixed frame forming a stationary base, a pair of pivot means carried by the frame at least one of which includes a pair of spaced pivots, a first link means including a pair of links of equal length between pivots each of which is pivotally mounted upon one of the spaced pivots, a second link means mounted upon the other pivot means, a gaging means pivotally mounted upon the first link means and having a length between pivots equal to that of the frame pivots, a cooperating gaging means pivotally mounted upon the other link means, the gaging means having a double movement longitudinally in one direction and laterally thereto towards and away from each other as the link means pivot for gaging and releasing a test part, a cooperating gaging surface carried by each gaging means, at least one of which is of a dimension to engage the test part at a substantial peripheral dimension of the test part and corresponding with the shape of the portion of the test part to be gaged, the cooperating gaging surfaces being in cooperative gaging relation with each other in a region including in-line position of the link means and positions adjacent thereto, the gaging surfaces being carried by the gaging means adjacent to each other, and means retaining the gaging means in cooperative relation as the link means swing upon their pivot means.

13. A gage for a test part comprising a fixed frame forming a stationary base, pivot means carried by the frame including at least one pair of spaced pivots, a first pair of links of equal length between pivots pivotally mounted upon the pivot means, a second pair of links of equal length between pivots pivotally mounted upon the pivot means, cooperating gaging means pivotally mounted upon each pair of links and having a length between pivots equal to that of the spaced frame pivots for parallel movement with respect to each other, the gaging means having a double movement longitudinally in one direction and laterally thereto towards and away from each other upon pivotal movement of the link means, a cooperating gaging surface carried by each gaging means at least one of which is of a dimension to engage a test part at a substantial peripheral dimension of the test part and corresponding with the shape of the portion of the test part to be gaged, the cooperating gaging surfaces being in cooperative gaging relation with each other in a region including in-line position of the link means and positions adjacent thereto, and the gaging surfaces being carried by the gaging means adjacent to each other.

14. A gage for a test part comprising a fixed frame forming a stationary base, a pair of spaced pivot means carried by the frame each of which includes a pair of spaced pivots, a pair of links of equal length between pivots pivotally mounted to the frame on one pair of spaced pivots, a second pair of links of equal length between pivots pivotally mounted to the frame on a second pair of spaced pivots, gaging means for each pair of links and pivotally mounted thereto and having a length between pivots equal to that of the spaced frame pivots for parallel movement with respect to each other, and a cooperating gaging surface carried by each gaging means at least one of which is of a dimension to engage a test part at a substantial peripheral dimension of the test part and corresponding with the shape of the portion of the test part to be gaged, the cooperating gaging surfaces being in cooperative gaging relation with each other in a region including in-line position of the link means and positions adjacent thereto, the gaging surfaces being carried by the gaging means adjacent to each other, and the cooperating gaging means having a double movement longitudinally in one direction and laterally thereto towards and away from each other during pivotal movement for gaging and releasing a test part.

15. A gage for a test part comprising a fixed frame forming a stationary base, pivot means carried by the frame including at least one pair of spaced pivots, a pair of links of equal length between pivots mounted upon the pivot means, a second pair of links of equal length between pivots mounted upon the pivot means, cooperating gaging means pivotally mounted to each pair of links and having a distance between pivots equal to that of the spaced frame pivots for parallel movement with respect to each other, the gaging means having a double movement longitudinally in one direction and laterally thereto towards and away from each other as the links pivot, a cooperating gaging surface carried by each gaging means at least one of which is of a dimension to engage a test part at a substantial peripheral dimension of the test part and corresponding with the shape of the portion of the test part to be gaged, the cooperating gaging surfaces being in cooperative gaging relation with each other in a region including in-line position of the link means and positions adjacent thereto, the gaging surfaces being carried by the gaging means adjacent to each other, and means retaining the gaging means in cooperating relation as the links swing upon the pivot means.

16. A gage for a test part comprising a fixed frame forming a stationary base, pivot means on the frame, a first link means mounted upon the pivot means and having a swingable portion, a second link means mounted upon the pivot means and having a swingable portion, gaging means pivotally mounted upon the swingable portion of each link means, a cooperating gaging surface carried by each gaging means at least one of which is of a dimension to engage a test part a substantial peripheral dimension of the test part and corresponding with the shape of the portion of the test part to be gaged, the cooperating gaging surfaces being in cooperating gaging position with respect to each other when the link means are in in-line position, the gaging surfaces being carried by the gaging means adjacent to each other, the link means and the gaging means having free movement to both sides of the in-line position of the link means, the gaging means moving towards and away from each other to and from gaging and releasing positions as the link means swing on the pivot means, and means connected with the gaging means to control the movement of the gaging means so that the cooperating gaging surfaces are in cooperating relation at gaging position as the link means swing on the pivot means.

17. A gage as in claim 16 including spring means connected between each gage means and the frame in parallel arrangement with the link means.

18. A gage as in claim 16 including means engaging both of the gaging means and retaining them in cooperative longitudinal relation as the link means swing upon their pivot means.

19. A gage for a test part comprising a fixed frame forming a stationary base, a pair of pivot means carried by the frame at least one of which includes a pair of spaced pivots, a first link means including a pair of links of equal length between pivots each of which is pivotally mounted upon one of the spaced pivots, a second link means mounted upon the other pivot means, a gaging means pivotally mounted upon the first link means and having a length between pivots equal to that of the frame pivots, a cooperating gaging means pivotally mounted upon the other link means whereby the gaging means move towards and away from each other as the link means pivot for gaging and releasing a test part, the link means and gaging means being free and unobstructed in their pivotal movement to both sides of the in-line position of the link means, and a cooperating gaging surface carried by each gaging means at least one of which is of a dimension to engage a test part at a substantial peripheral dimension of the test part and corresponding with the shape of the portion of the test part to be gaged, the cooperating gaging surfaces being in cooperating gaging position with respect to each other when the link means are in in-line position, the gaging surfaces being carried by the gaging means adjacent to each other, and means for retaining the gaging means in cooperative relation as the link means swing upon their pivots.

20. A gage as in claim 19 including spring means connected between each gage means and the frame in parallel arrangement with the link means.

21. A gage as in claim 19 including means engaging both of the gaging means and retaining them in cooperative longitudinal relation as the link means swing upon their pivot means.

22. A gage for a test part comprising a fixed frame forming a stationary base, pivot means on the frame, a first link means mounted upon the pivot means and having a swingable portion, a second link means mounted upon the pivot means and having a swingable portion, the first and second link means having their swingable portions directed away from each other, gaging means pivotally mounted upon the swingable portion of each link means, a cooperating gaging surface carried by each gaging means at least one of which is of dimension to engage the test part at a substantial peripheral dimension of the test part and corresponding with the shape of the portion of the test part to be gaged, the cooperating gaging surfaces being in cooperative gaging relation with each other in a region including in-line position of the link means and positions adjacent thereto, the gaging surfaces being carried by the gaging means adjacent to each other, and the gaging means moving with a double movement longitudinally in one direction and laterally thereto towards and away from each other to and from gaging and releasing positions as the link means swing on the pivot means, and means connected with the gaging means to control the movement of the gaging means so that the cooperating gaging surfaces are in cooperative gaging relation at gaging position as the link means swing on the pivot means.

23. A gage for a test part comprising a fixed frame forming a stationary base, pivot means on the frame including a pair of spaced pivots, a first link means including a pair of links of equal length between pivots each of which is mounted upon a spaced pivot and having a swingable portion, a second link means mounted upon the pivot means and having a swingable portion, the first and second link means having their swingable portions directed away from each other, gaging means pivotally mounted upon the swingable portions of the first link means, gaging means pivotally mounted upon the second link means, a cooperating gaging surface carried by each gaging means at least one of which is of dimension to engage the test part at a substantial peripheral dimension of the test part and corresponding with the shape of the portion of the test part to be gaged, the cooperating gaging surfaces being in cooperative gaging relation with each other in a region including in-line position of the link means and positions adjacent thereto, the gaging surfaces being carried by the gaging means adjacent to each other, and the gaging means moving with a double movement longitudinally in one direction and laterally thereto towards and away from each other to and from gaging and releasing positions as the link means swing on the pivot means, and means connected with the second gaging means to control the movement thereof so that the cooperating gaging surfaces are in cooperative gaging relation at gaging position as the link means swing on the pivot means.

24. A gage as in claim 23 including means to retain the gaging means in lateral alignment.

25. A gage for a test part comprising a fixed frame forming a stationary base, pivot means on the frame including at least one pair of spaced pivots, a first pair of links mounted upon spaced pivots and having a swingable portion, a second pair of links mounted upon spaced pivots and having a swingable portion, the first and second pairs of links having their swingable portions directed away from each other, gaging means pivotally mounted upon the swingable portion of each pair of links, a cooperating gaging surface carried by each gaging means at least one of which is of dimension to engage the test part at a substantial peripheral dimension of the test part and corresponding with the shape of the portion of the test part to be gaged, the cooperating gaging surfaces being in cooperative gaging relation with each other in a region including in-line position of the link means and positions adjacent thereto, the gaging surfaces being carried by the gaging means adjacent to each other, and the gaging means moving with a double movement longitudinally in one direction and laterally thereto towards and away from each other to and from gaging and releasing position as the link means swing on the pivot means.

26. A gage for a test part comprising a fixed frame forming a stationary base, pivot means on the frame including at least one pair of spaced pivots, a first link means mounted upon the pivot means and having a swingable portion, a second link means mounted upon the pivot means and having a swingable portion, the first and second link means having their swingable portions directed towards each other, gaging means pivotally mounted upon the swingable portion of each link means, a cooperating gaging surface carried by each gaging means at least one of which is of dimension to engage the test part at a substantial peripheral dimension of the test part and corresponding with the shape of the portion of the test part to be gaged, the cooperating gaging surfaces being in cooperative gaging relation with each other in a region including in-line position of the link means and positions adjacent thereto, the gaging surfaces being carried by the gaging means adjacent to each other, and the gaging means moving with a double movement longitudinally in one direction and laterally thereto towards and away from each other to and from gaging and releasing positions as the link means swing on the pivot means, means connected with the gaging means to control the movement of the gaging means so that the cooperating gaging surfaces are in cooperative gaging relation at gaging position as the link means swing on the pivot means, and the gaging means for each link means being located on the opposite side of the other gaging means with respect to its pivot means.

27. A gage as in claim 26 in which the pivot means includes a first pair of substantially spaced pivots and a second pair of substantially spaced pivots, the pairs of pivots being parallel with each other, in which the first link means and the second link means each include a pair of links, and in which each cooperating gaging means has a distance between pivots for the pair of links equal to that of spaced frame pivots for parallel movement with respect to each other whereby the gaging means move towards and away from each other as the links pivot.

28. A gage as in claim 27 in which the swingable portion of each pair of links extends beyond the swingable portion of the other pair of links.

29. A gage for a test part comprising a fixed frame forming a stationary base, pivot means on the frame including two pairs of parallel spaced pivots, a first link means including a pair of links of equal length between pivots, each of said links being mounted upon a spaced pivot of one pair and having a swingable portion, a second link means including a pair of links of equal length between pivots, each of said links being mounted upon a spaced pivot of the other pair and having a swingable portion, the first and second pairs of links being of equal length between pivots, gaging means pivotally mounted upon the swingable portion of each link means and having a distance between pivots equal to that of the spaced frame pivots whereby the gaging means have parallel movement throughout their movement, a cooperating gaging surface carried by each gaging means at least one of which is of dimension to engage the test part at a substantial peripheral dimension of the test part and corresponding with the shape of the portion of the test part to be gaged, the cooperating gaging surfaces being in cooperative gaging relation with each other in a region including in-line position of the link means and positions adjacent thereto, the gaging surfaces being carried by the gaging means adjacent to each other, and the gaging means moving with a double movement longitudinally in one direction and laterally thereto towards and away from each other to and from gaging and releasing positions as the link means swing on the pivot means.

30. A gage as in claim 29 including means to retain the gaging means in lateral alignment.

PAUL W. JOHNSON.

REFERENCES CITED

The following references are of record in the file of this patent:

UNITED STATES PATENTS

| Number | Name | Date |
|---|---|---|
| 672,493 | Raus | Apr. 23, 1901 |
| 1,095,552 | Colpitts | May 5, 1914 |
| 1,337,018 | Lockey et al. | Apr. 13, 1920 |
| 1,875,726 | Hartness | Sept. 6, 1932 |
| 1,903,393 | Vlcek | Apr. 4, 1933 |
| 2,142,465 | Von Graf et al. | Jan. 3, 1939 |
| 2,363,077 | Moore | Nov. 21, 1944 |

FOREIGN PATENTS

| Number | Country | Date |
|---|---|---|
| 3,958 | Great Britain | Sept. 30, 1880 |
| 14,326 | France | July 28, 1855 |
| 34,728 | France | Apr. 16, 1929 |